Patented Jan. 1, 1946

2,392,167

UNITED STATES PATENT OFFICE 2,392,167

AZO DYESTUFFS

Robert Sidney Long, Martinsville, N. J., assignor to American Cyanamid Company, New York, N. Y., a corporation of Maine No Drawing. Application September 16, 1942, Serial No. 458,567

10 Claims. (Cl. 260—193)

This invention relates to a new class of metallizable azo dyestuffs having as one component of the molecule an acylacetonitrile.

The dyes of the present invention may be represented by the formula:

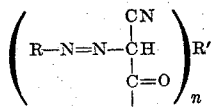

in which R is the residue of a diazotized amine which may contain other azo groups and which contains ortho to the azo group a hydroxyl or carboxyl group, R' is a cyclic radical which may be aromatic, aralkyl or hydroaromatic, and $n$ is an integer in the group consisting of 1 and 2.

The acylacetonitriles used in preparing the azo dyes in the present invention may be represented by the following formula:

in which R' is a cyclic radical of the aromatic, aralkyl or hydroaromatic series and $n$ is an integer in the group consisting of 1 and 2. Where $n$ is 2 there will be 2 acetonitrile groups and the azo dyes produced will have two azo groups. The formula at first glance would appear to represent dyes which would not be susceptible to metallization as the azo acetonitrile does not appear to have metallizable groups ortho to the azo group. However, I have found that the acylacetonitrile when part of an azo dye exists in equilibrium with a tautomeric enol form, providing the necessary hydroxyl group ortho to the azo group to permit metallization. An unusual type of metallizable dye is therefore produced opening up a new field for metallizable azo dyes.

The dyes may be used either for dying materials in the presence of complex forming metal compounds, as for example by the metachrome process, or may be used for dying materials which are after treated with such metal compounds as above in the top chrome process, or metallized dye complexes may be produced with the metals which form such complexes. The metallized dye complexes themselves are not claimed in the present invention, forming the subject matter of my copending application Serial No. 458,566, filed September 16, 1942.

It is an advantage of the present invention that the coupling proceeds normally and no particular new techniques need be learned. The coupling should be performed in a weakly alkaline reaction medium and offers no particular difficulties. In general any of the well known diazo compounds may be employed, including both diazo and tetrazo compounds, so long as they contain at least one hydroxyl or carboxyl group ortho to the diazo group.

Typical amines are those which have in ortho position a hydroxyl or carboxyl group and as examples of such amines there may be mentioned: 2-amino-4-nitrophenol, 2-amino-5-nitrophenol, 2-amino-4-chlorophenol, 3-amino-4-hydroxybenzenesulfonic acid, 2-methyl-4-amino-5-hydroxybenzenesulfonic acid, 2-nitro-4-amino-5-hydroxybenzenesulfonic acid, 2-chloro-4-amino-5-hydroxybenzenesulfonic acid, 2-hydroxy-3-amino-5-chlorobenzenesulfonic acid, 3-amino-4-hydroxy-5-nitrobenzenesulfonic acid, 2-hydroxy-3-amino-5-nitrobenzenesulfonic acid, 2-hydroxy-3-amino-5-sulfobenzoic acid, 2-amino-5-sulfobenzoic acid, anthranilic acid, 1-amino-2-hydroxynaphthalene-4-sulfonic acid, 1-amino-2-hydroxy-6-nitronaphthalene-4-sulfonic acid, 2-amino-3-hydroxybenzoic acid.

The diazo compound may be also further substituted by azo groups and the acylacetonitriles of the present invention may be used also as end components in polyazo dyes.

Some of the acylacetonitriles used in the present invention are new chemical compounds. A few, such as for example benzoylacetonitrile, have been known before, although they have never been used in the production of metallizable azo dyes. The present invention is not particularly concerned with any special process about preparing the acylacetonitriles used. Essentially there are four practical methods of preparing these compounds:

(1) The corresponding omega halogen methyl ketone such as the omega chloromethyl ketone is reacted with a soluble cyanide such as an alkali metal cyanide in aqueous alcoholic solution.

(2) An ester, preferably the methyl ester of the carboxylic acid corresponding to the acyl group is condensed with acetonitrile in the presence of a metal alkoxide, such as sodium methylate, potassium methylate, sodium ethylate, aluminum isoproproxide and the like. The alkali metal alcoholates may be used as such or produced in situ by reaction of the corresponding alkali metal with the alcohol.

(3) A methyl ketone is condensed with methyl formate in the presence of a metal alkoxide, preferably a methylate, to give a beta keto aldehyde which is then converted into the corresponding oxime and subsequently dehydrated.

(4) Cyanoacetyl halide, preferably cyanoacetyl chloride, is condensed with an aromatic compound in the presence of a Friedel-Crafts condensing agent.

Among the groups of acylacetonitriles employed in the present invention, the aromatic acylacetonitriles are particularly important as the dyestuffs produced from them are in general of greater commercial interest. The aromatic acylacetonitriles may be of the benzene series or may be polynuclear belonging to the naphthalene, acenaphthene, anthracene or biphenyl series. Other condensed ring polynuclear acetonitriles may also be used, but their higher cost renders them of less economic interest.

The aromatic acylacetonitriles may also include heterocyclic compounds of which those belonging to the furan series, such as alpha-furoylacetonitrile are of particular interest. Other heterocyclic acetonitriles such as those containing pyridine, quinoline and similar nitrogen containing rings may also be employed.

A number of valuable dyes may be produced from aromatic acylacetonitriles in which the aromatic radical is unsubstituted. The invention, however, is in no sense limited thereto, and in addition to typical unsubstituted aryl acetonitriles such as the benzoylacetonitrile, alpha or beta naphthoylacetonitrile, 5-cyanoacetylacenaphthene, and 4,4'-bis(cyanoacetyl)biphenyl, substituted compounds may also be used. Typical examples of substituted compounds are p-toluylacetonitrile, m-nitrobenzoylacetonitrile, the m-aminobenzoylacetonitrile, the 4-chlorobenzoylacetonitrile, the 3,4-dichlorobenzoylacetonitrile, the 4-hydroxybenzoylacetonitrile, the 2- and the 4-methoxybenzoylacetonitrile, the 2,4-dimethoxybenzoylacetonitrile, the 3,4,5-trimethoxybenzoylacetonitrile, the 2-methoxy-3-naphthoylacetonitrile, the 3-carboxybenzoylacetonitrile, the alpha-naphthoylacetonitrile monosulfonic acid and the 2-methoxy-5-sulfobenzoylacetonitrile.

A typical aralkyl acetonitrile is phenacetylacetonitrile and typical acylacetonitriles of the hydroaromatic series are hexahydrobenzoylacetonitrile and 6-cyanoacetyl-1,2,3,4-tetrahydronaphthalene.

The acylacetonitriles used in the present invention all contain the acyl group from organic carboxylic acids and in the present specification and classification the term "acyl" is restricted to such radicals and is not intended to include radicals of other acids.

It is an advantage of the present invention that the acylacetonitriles may be used either as the only coupling component or as part of the coupling components in polyazo dyes. A very wide field of utility is, therefore, assured and a large number of useful mono and polyazo dyes may be produced which include the new coupling components of the present invention.

The invention will be described in greater detail in conjunction with the following examples which are typical illustrations. The parts are by weight.

*Example No. 1*

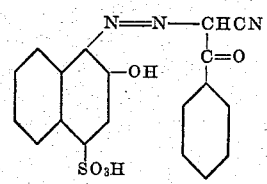

A suspension of 45 parts of the diazo compound from 1-amino-2-hydroxy-4-naphthalenesulfonic acid in 180 parts of water and 36 parts of 20% sodium hydroxide solution is added slowly to a solution of 28.8 parts of benzoylacetonitrile in 120 parts of water and 180 parts of 20% sodium hydroxide solution previously cooled to about 10° C. The cooling bath is removed and the reaction mixture is stirred at room temperature for several hours and then at 40° C. for a short time. The dyestuff is isolated by acidification and filtration. The dyestuff, which is obtained in excellent yield, dyes wool a buff shade which is converted to a bluish-buff by after-chroming. Metachroming gives a deeper bluish red tint. The use of salts of cobalt, nickel, and copper in the dyebath gives various shades of red.

*Example No. 2*

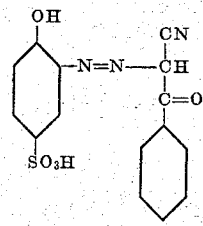

A solution of the diazo compound prepared in the usual way from 6 parts of 3-amino-4-hydroxybenzenesulfonic acid is added slowly to a cooled solution of 4.8 parts of benzoylacetonitrile in 20 parts of water and 30 parts of 20% sodium hydroxide. Coupling proceeds rapidly and after stirring a short time the reaction is complete. The addition of salt and mineral acid precipitates the yellow-orange dye in excellent yield. It dyes wool a yellow shade which is converted to a yellow-red by after-chroming. A similar shade is obtained by the metachrome method. The use of salts of cobalt, nickel, and copper in the dyebath gives bright orange shades of improved fastness properties.

*Example No. 3*

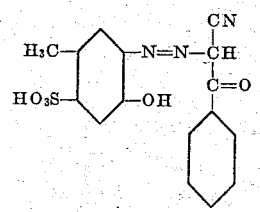

To a cooled solution of 4.5 parts of benzoylacetonitrile in 20 parts of water and 20 parts of 20% sodium hydroxide is added slowly a diazo solution prepared in the usual way from 7.6 parts of 2-methyl-4-amino-5-hydroxybenzenesulfonic acid (purity—80%). The reaction mixture is stirred for a number of hours and then to it is added salt equivalent to 20% of the volume. In this manner the dyestuff is precipitated as the red sodium salt. It is removed by filtration and dried at 60° C. The product dyes wool a yellow shade which is converted to a red by after-chroming. When dyed by the metachrome process a red shade is obtained. Orange to red shades are obtained when cobalt, nickel, or copper salts are used in the dyebath.

*Example No. 4*

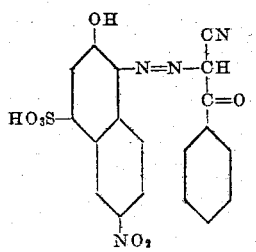

A solution of 9.4 parts of the diazo compound prepared from 1-amino-2-hydroxy-6-nitro-4-naphthalenesulfonic acid in 30 parts of water and 6 parts of 20% sodium hydroxide is added slowly to a cooled solution of 4.8 parts of benzoylacetonitrile in 20 parts of water and 30 parts of 20% sodium hydroxide. Coupling takes place rapidly and a deep red solution is obtained. After stirring for a short time at room temperature, the reaction mixture is acidified with mineral acid and the precipitated dye is removed by filtration. The dye dyes wool a buff shade which is converted to a tan by after-chroming. When the metachrome process is employed a yellow-red shade is obtained, while the use of salts of copper, nickel, and cobalt in the dyebath gives various shades of orange.

*Example No. 5*

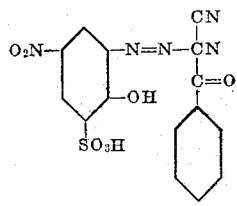

The diazo compound prepared in the usual way from 7.8 parts of 3-nitro-5-amino-6-hydroxybenzenesulfonic acid is added slowly to a solution of 4.8 parts of benzoylacetonitrile in 50 parts of water, 6.6 parts of 20% sodium hydroxide, and 16.5 parts of 20% sodium acetate solution. During the addition 20% sodium hydroxide solution is added as needed to keep the solution faintly alkaline to brilliant yellow test paper. Coupling takes place rapidly and the reaction is complete shortly after the addition of the diazo compound is completed. The dyestuff is isolated as the sodium salt by cautious neutralization of the reaction mixture with mineral acid. The product dyes wool an orange shade which is converted to a brownish-orange by the top chrome method. By the metachrome process a reddish-brown color is obtained, whereas the use of copper, nickel, and cobalt salts in the dyebath gives various shades of yellow-brown.

*Example No. 6*

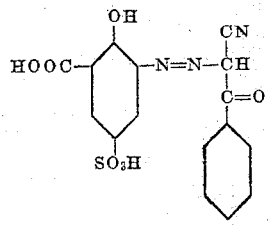

The diazo compound prepared in the usual way from 7 grams of 2-hydroxy-3-amino-5-sulfobenzoic acid is added slowly to a solution of 4.4 parts of benzoylacetonitrile in 50 parts of water and 10 parts of 20% sodium hydroxide. Coupling proceeds rapidly, but it is necessary to add an additional amount of caustic from time to time during the addition in order to keep the solution faintly alkaline to brilliant yellow test paper. The solution is stirred for a short time after the addition of the diazo compound is complete, and is then salted and acidified, giving a yellow crystalline precipitate of the dyestuff in excellent yield. The product dyes wool a yellow shade which is converted to a yellow-brown shade by the top chrome method. By the metachrome process a yellow-brown shade is obtained, while the use of copper, nickel, and cobalt salts in the dyebath gives reddish-yellow to orange shades.

*Example No. 7*

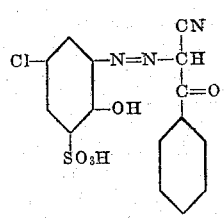

The diazo solution prepared in the usual way from 6 grams of 2-hydroxy-3-amino-5-chlorobenzenesulfonic acid is added dropwise to a solution of 3.9 parts of benzoylacetonitrile in 10 parts of water and 20 parts of 20% sodium hydroxide. During the addition, it is necessary to add more water in order to permit efficient stirring. Coupling takes place rapidly and the reaction is complete as soon as the diazo is added. Acidification of the solution with mineral acid precipitates the dyestuff as a yellow solid in excellent yield. The product dyes wool a yellow-orange shade which is converted to a Bordeaux shade by the top chrome method. By the metachrome process a Bordeaux shade is obtained, and reddish-orange to red shades are obtained by the use of salts of cobalt, nickel, and copper in the dyebath.

*Example No. 8*

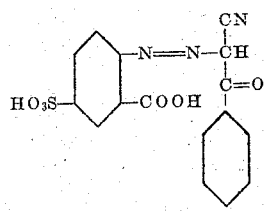

A suspension of the diazo compound prepared in the usual manner from 4.8 parts of 2-amino-5-sulfobenzoic acid is added slowly to a cooled solution of 3 parts of benzoylacetonitrile in 20 parts of water and 20 parts of 20% sodium hydroxide. Coupling takes place rapidly. The reaction mixture is diluted somewhat with water, a small amount of salt is added, and hydrochloric acid is then added to precipitate the dyestuff in excellent yield. The product dyes wool a brilliant yellow shade which is converted to a reddish-yellow by the top chrome method. A reddish-yellow shade is obtained by the metachrome process, and reddish-yellow shades result when salts of cobalt and nickel are used in the dyebath. The use of copper salts gives yellow-green shades.

Example No. 9

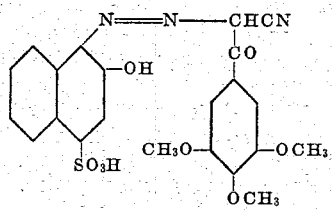

38.8 parts of methyl trimethylgallate are mixed with 9.2 parts of sodium methylate and 8.7 parts of acetonitrile is added slowly at 80° C. As the reaction proceeds the mixture becomes thick and a small amount of dichlorobenzene is added to facilitate stirring. When the reaction is complete the mixture is cooled, diluted with water, the aqueous layer separated and acidified with mineral acid. A precipitate forms which is removed by filtration, washed with sodium bicarbonate and dried. This constitutes 3,4,5-trimethoxybenzoylacetonitrile and melts at 138–139° C.

2.4 parts of the product is dissolved in 20 parts of water and 3 parts of 20% sodium hydroxide and the solution cooled. 2.5 parts of diazotized 1-amino-2-hydroxy-4-naphthalenesulfonic acid in 20 parts of water and 3 parts of 20% sodium hydroxide is slowly added to the cooled solution and the reaction mixture then stirred at room temperature for several hours, followed by warming to 40° C. for a short time to complete the coupling. The azo dye is obtained as a bright red solid by acidification and filtration. The dye will dye wool either as an acid dye or as a chrome dye by the top chrome or metachrome methods. The product dyes wool a tan shade which is converted to a deeper tan by after-chroming. A violet shade is obtained by the metachrome method.

Example No. 10

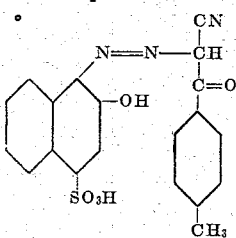

To a cooled solution of 3.2 parts of 4-methylbenzoylacetonitrile in 40 parts of water and 3 parts of 20% sodium hydroxide is added slowly a suspension of 5 parts of the diazo compound from 1-amino-2-hydroxy-4-naphthalenesulfonic acid in 20 parts of water and 5 parts of 20% sodium hydroxide. The reaction mixture is stirred for a short time at room temperature, diluted with an equal volume of water, and acidified with mineral acid. The precipitated dye is removed by filtration and dried. The product dyes wool a buff shade. After-chroming gives a Bordeaux shade and a violet shade is obtained by the metachrome method. Redder shades are obtained by using cobalt, nickel, and copper as the metals in the dye bath.

Example No. 11

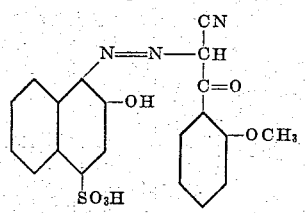

33.2 parts of methyl 2-methoxybenzoate are reacted with 11.4 parts of sodium methylate and 10.3 parts of acetonitrile. The reaction mixture is heated for several hours at 80–100° C., and the product isolated by dissolving the reaction mixture in water and acidifying with mineral acid. The 2-methoxybenzoylacetonitrile obtained has a melting point of 87° C.

8.8 parts of the 2-methoxybenzoylacetonitrile are dissolved in 50 parts of water, the solution cooled and 20 parts of 20% sodium hydroxide added. The cooled mixture is then slowly added to a suspension of 12.5 parts of diazotized 1-amino-2-hydroxy-4-naphthalenesulfonic acid in 50 parts of water with 12 parts of 20% sodium hydroxide. The addition is effected with stirring and the stirring is continued after the addition at room temperature for a short time. Thereupon the reaction mixture is diluted with 170 parts of water and acidified with mineral acid. A red dye precipitates and is recovered by filtration. The yield is excellent. The product dyes wool a reddish-yellow shade which is changed to a buff shade by after-chroming. Metachroming gives a Bordeaux shade, and red shades are obtained if salts of cobalt, nickel, and copper are used in the dyebath.

Example No. 12

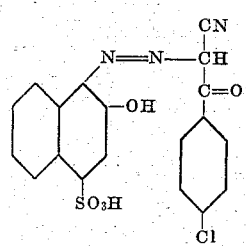

A suspension of 2.5 parts of the diazo compound from 1-amino-2-hydroxy-4-naphthalenesulfonic acid in 15 parts of water and 2 parts of 20% sodium hydroxide is added slowly to a cooled solution of 1.8 parts of 4-chlorobenzoylacetonitrile in 30 parts of water and 4 parts of 20% sodium hydroxide. The reaction mixture is stirred for about 2 hours at room temperature and then for about ½ hour at 40° C. Acidification with mineral acid and filtration gives the dye in good yield. The product dyes wool a buff shade which is converted to a pale violet by after-chroming. A yellow-brown shade is obtained by the metachrome process, while salts of cobalt, nickel, and copper in the dyebath give red shades.

Example No. 13

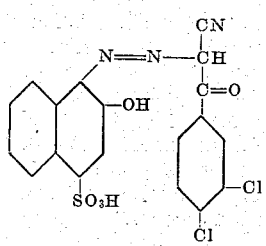

57.3 parts of 3,4-dichlorobenzoic acid are esterified with 115 parts of methyl alcohol, using 1.7 parts of sulfuric acid as a catalyst. 21 parts of methyl 3,4-dichlorobenzoate are reacted with 10.3 parts of acetonitrile and 11.4 parts of sodium methylate at 80–100° C. When the reaction is complete the product is isolated by adding water, filtering and acidifying the filtrate. The 3,4-dichlorobenzoylacetonitrile obtained has a melting point of 105–107° C.

A suspension of 2.5 parts of diazotized 1-amino-2-hydroxy-4-naphthalenesulfonic acid in 20 parts of water and 3 parts of 20% sodium hydroxide is added slowly to a solution of 2.2 parts of 3,4-dichlorobenzoylacetonitrile in 20 parts of water and 2 parts of 20% sodium hydroxide. After stirring the reaction mixture for a short time at room temperature it is diluted with water, acidified with mineral acid and the precipitated dye removed by filtration. The product dyes wool a buff shade which is converted to red by after-chroming. The metachrome process gives a violet shade, while salts of cobalt, nickel, and copper in the dyebath give various shades of red having improved fastness.

*Example No. 14*

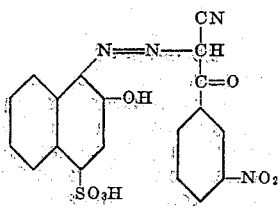

To a cooled solution of 1.9 parts of 3-nitrobenzoylacetonitrile and 4 parts of 20% sodium hydroxide in 30 parts of water is added slowly 2.5 parts of the diazo compound from 1-amino-2-hydroxy-4-naphthalenesulfonic acid in 2 parts of 20% sodium hydroxide and 10 parts of water. After stirring for several hours at room temperature, the reaction mixture is acidified and the precipitated dye is removed by filtration. The product dyes wool a buff shade which is converted to a violet shade by after-chroming. A deep shade of violet is obtained by the metachrome process, while salts of cobalt, nickel, and copper in the dyebath give various shades of red.

*Example No. 15*

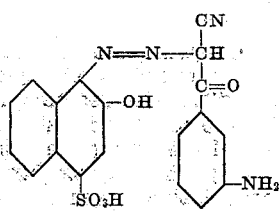

3-nitrobenzoylacetonitrile is catalytically reduced with hydrogen in alcohol solution using a Raney nickel catalyst. The reaction is carried out in an autoclave under hydrogen pressure of 1000 pounds using 32 parts of alcohol and 5 part of Raney nickel catalyst per 9.5 parts of 3-nitrobenzoylacetonitrile. After the reaction is complete the product is washed out of the autoclave with further amounts of alcohol, and water is added to the alcohol slurry to precipitate the product completely. The 3-aminobenzoylacetonitrile produced is purified by dissolving in dilute hydrochloric acid and reprecipitating with sodium bicarbonate. The product melts at 87°–95° C.

A suspension of 2.5 parts of the diazo compound from 1-amino-2-hydroxy-4-naphthalenesulfonic acid in 20 parts of water and 3 parts of 20% sodium hydroxide is added slowly to a solution of 1.6 parts of the 3-aminobenzoylacetonitrile in 20 parts of water and 4 parts of 20% sodium hydroxide. After stirring for a number of hours at room temperature, the reaction mixture is acidified and the precipitated dye is removed by filtration.

*Example No. 16*

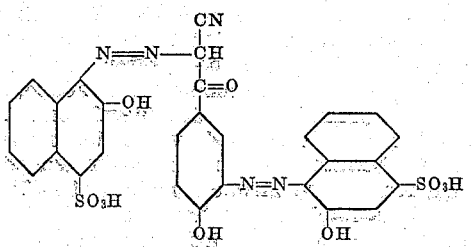

4-hydroxychloroacetophenone is reacted with sodium cyanide in aqueous alcoholic solution to produce 4-hydroxybenzoylacetonitrile, 1.6 parts of which are dissolved in 15 parts of water and 8 parts of 20% sodium hydroxide and the solution cooled. 5 parts of diazotized 1-amino-2-hydroxy-4-naphthalenesulfonic acid are dissolved in 20 parts of water and 6 parts of 20% sodium hydroxide, and the solution is gradually added to the cooled solution of the 4-hydroxybenzoylacetonitrile. After the addition is complete the reaction mixture is stirred for about 2 hours at room temperature, and then for about ½ hour at 40° C. The reaction mixture is then acidified and the dye salted out.

*Example No. 17*

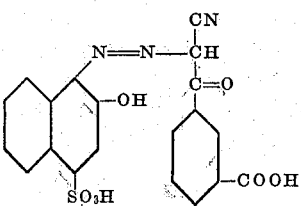

9.7 parts of dimethylisophthalate are reacted with 5.7 parts of sodium methylate and 5.3 parts of acetonitrile by heating for several hours at 80–100° C. The reaction mixture is cooled, water added, and the solution filtered. Acidification of the solution produces a tan precipitate which is purified by dissolving in a sodium bicarbonate solution and reprecipitating with hydrochloric acid. It melts with decomposition at 170–175° C. and is 3-carboxybenzoylacetonitrile.

To a cooled solution of 2.8 parts of 3-carboxybenzoylacetonitrile in 10 parts of water and 6 parts of 20% sodium hydroxide is added slowly a suspension of 3.7 parts of the diazo compound from 1-amino-2-hydroxy-4-naphthalenesulfonic acid in 10 parts of water and 4 parts of 20% sodium hydroxide. The deep red solution obtained is stirred for several hours at room temperature and then for ½ hour at 40° C. Dilution with an equal volume of 20% salt solution and acidification with mineral acid gives an excellent yield of the bright red dyestuff. The product dyes wool a buff shade which is converted to a tan by after-chroming. The metachrome process gives a violet shade, while various shades of red are obtained with salts of cobalt, nickel, and copper in the dyebath.

*Example No. 18*

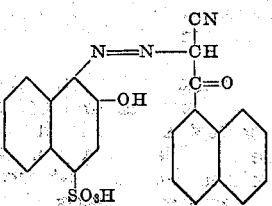

71.9 parts of methyl alpha-naphthoate are heated with 22 parts of sodium methylate and 19.8 parts of acetonitrile at 95–100° C. Stirring should be continuous and is facilitated by a small amount of dichlorobenzene. After reaction is complete the mixture is cooled, water added, and the product precipitated with mineral acid. The precipitate may be purified by washing with sodium bicarbonate solution, and after recrystallization from ethyl alcohol, melts at 96–97° C., and is alpha-naphthoylacetonitrile.

3.9 parts of alpha-naphthoylacetonitrile are suspended in 60 parts of water and 8 parts of 20% sodium hydroxide. To this suspension there is added slowly 5.5 parts of diazotized 1-amino-2-hydroxy-4-naphthalenesulfonic acid in 20 parts of water with 4 parts of 20% sodium hydroxide. After stirring for several hours at room temperature a reddish-brown solution is obtained and the coupling is completed by heating for a short period at 40° C. On acidification of the reaction mixture with mineral acid a good yield is obtained of an orange precipitate which dyes wool a buff shade, converted to a blue-red by after-chroming. The metachrome process gives a yellow-red shade, while various shades of red are obtained with salts of cobalt, nickel, and copper in the dyebath.

*Example No. 19*

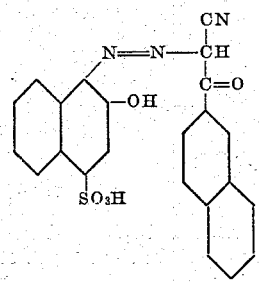

To a slurry of 2.9 parts of beta-naphthoylacetonitrile in 45 parts of water and 6 parts of 20% sodium hydroxide is added slowly 4.2 parts of the diazo compound from 1-amino-2-hydroxy-4-naphthalenesulfonic acid in 15 parts of water and 3 parts of 20% sodium hydroxide. After stirring the reaction mixture for several hours at room temperature, the product is isolated by acidification and filtration. The new dyestuff dyes wool a yellow-orange shade which is converted to a purple shade by after-chroming. The metachrome process gives a slightly deeper purple shade, while salts of cobalt, nickel, and copper in the dyebath give various shades of red.

*Example No. 20*

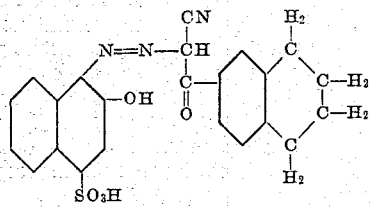

6-chloroacetyl-1,2,3,4-tetrahydronaphthalene is reacted with sodium cyanide in aqueous alcohol to produce 6-cyanocetyl-1,2,3,4-tetrahydronaphthalene.

1.8 parts of 6-cyanoacetyl-1,2,3,4-tetrahydronaphthalene are dissolved in 30 parts of water with 8 parts of 20% sodium hydroxide to which solution there is added slowly a slurry of 2.5 parts of diazotized 1-amino-2-hydroxy-4-naphthalenesulfonic acid in 20 parts of water with 4 parts of 20% sodium hydroxide. The reaction mixture is stirred until the reaction is complete and is then acidified and the precipitated dye recovered by filtration. This product dyes wool a buff shade which is converted to a bluish shade by after-chroming. The metachrome process gives a violet shade, while various shades of red are obtained with salts of cobalt, nickel, and copper in the dyebath.

*Example No. 21*

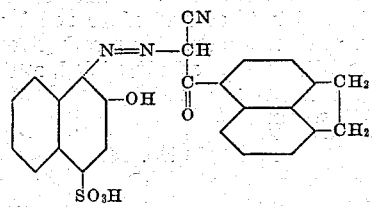

A suspension of 2.5 parts of 5-cyanoacetylacenaphthene in 10 parts of water and 4 parts of 20% sodium hydroxide is added slowly to a suspension of 2.5 parts of the diazo compound from 1-amino-2-hydroxy-4-naphthalenesulfonic acid in 10 parts of water and 3 parts of 20% sodium hydroxide. After stirring for about 1 hour at room temperature the dyestuff is precipitated in excellent yield by the addition of acid. It dyes wool an orange shade which is converted to a purple by after-chroming. The metachrome process gives a purple shade, while salts of copper, cobalt, and nickel in the dyebath produce various shades of red.

*Example No. 22*

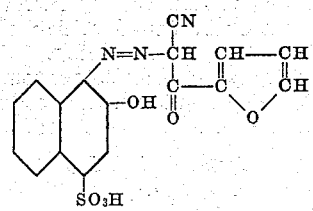

12.6 parts of methyl furoate are heated at 80–100° C. with 5.7 parts of sodium methylate and 5.3 parts of acetonitrile. The reaction mixture is then cooled and the product isolated by adding water, filtering and acidifying the filtrate. The precipitate can be purified by washing with sodium bicarbonate solution and melts at 79.5–80.5° C. It is furoylacetonitrile.

2.7 parts of furoylacetonitrile are dissolved in 20 parts of water and 8 parts of 20% sodium hydroxide, and the solution cooled. Then there is added slowly a suspension of 5 parts of diazotized 1-amino-2-hydroxy-4-naphthalenesulfonic acid in 20 parts of water and 4 parts of 20% sodium hydroxide. The reaction mixture is stirred at room temperature until the reaction is complete and the product is isolated by acidification and filtration. It dyes wool a buff shade which is not appreciably changed by after-chroming. The metachrome process gives a violet shade, while various shades of red are obtained with salts of cobalt, nickel, and copper in the dyebath.

*Example No. 23*

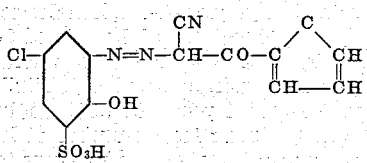

A suspension of diazo compound prepared in the usual way from 3 parts of 2-hydroxy-3-amino- 5-chlorobenzenesulfonic acid is added slowly to a cooled solution of 1.5 parts of alpha furoylacetonitrile in 10 parts of water and 2.6 parts of 20% sodium hydroxide. After stirring for a short time at room temperature the reaction is complete and the red precipitate which separates is removed by filtration. As an acid color it dyes wool a yellow shade which is converted to an attractive Bordeaux shade by after-chroming.

*Example No. 24*

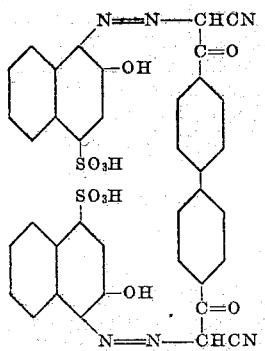

4,4'-dichloroacetylbiphenyl is reacted with sodium cyanide in alcohol solution in the presence of a small amount of water. The product, 4,4'-dicyanoacetylbiphenyl, is isolated in nearly quantitative yields by diluting the reaction mixture with water and acidifying with hydrochloric acid.

1.4 parts of the dicyanoacetylbiphenyl are suspended in 10 parts of water and 4 parts of 20% sodium hydroxide. To this suspension there is added slowly a slurry of 2.5 parts of diazotized 1-amino-2-hydroxy-4-naphthalenesulfonic acid in 10 parts of water and 2.5 parts of 20% sodium hydroxide. The reaction mixture is stirred at room temperature until the coupling is complete and a red solution is obtained. The reaction mixture is then diluted with an equal volume of water and 10% of salt is added. The precipitation of the sodium salt of the dyestuff is completed by neutralization with hydrochloric acid. The precipitate is recovered by filtration and dried at 60° C. It dyes wool a buff shade which is converted to a tan by after-chroming. The metachrome process gives a violet shade, while salts of cobalt, nickel, and copper in the dyebath give various shades of red.

*Example No. 25*

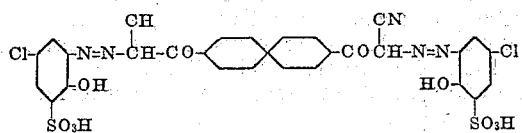

A diazo solution prepared in the usual way from 10 parts of 2-hydroxy-3-amino-5-chlorobenzenesulfonic acid is added slowly to a cool solution of 6.1 parts of 4,4'-dicyanoacetylbiphenyl in 30 parts of water and 12 parts of 20% sodium hydroxide. Additional caustic is added when needed to keep the solution alkaline to phenolphthalein. When the coupling is complete, the reaction mixture is diluted somewhat, acidified with mineral acid, and treated with salt to precipitate the dyestuff. The product dyes wool a yellow shade which is converted to a Bordeaux shade by after-chroming. A Bordeaux shade is also obtained by the metachrome method. Attractive orange shades are obtained by the use of salts of cobalt, nickel, and copper in the dyebath.

*Example No. 26*

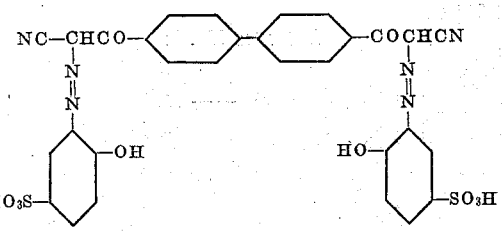

A diazo solution prepared in the usual way from 5.7 parts of 3-amino-4-hydroxy-benzenesulfonic acid is added slowly to a slurry of 4.3 parts of 4,4'-dicyanoacetylbiphenyl in 75 parts of water and 30 parts of 20% sodium hydroxide solution. As the coupling takes place, the biphenyl derivative goes into solution and a deep red solution is obtained. When the coupling is complete, salt is added and the mixture is acidified with mineral acid. The precipitated red dyestuff is removed by filtration and dried. The product dyes wool a yellow shade which is converted to a red shade by after-chroming. The metachrome process gives a red shade, while orange to red shades are obtained with salts of cobalt, nickel, and copper in the dyebath.

*Example No. 27*

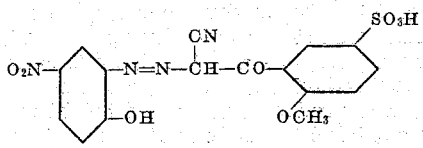

2-methoxybenzoylacetonitrile is sulfonated below 12° C. with 20% oleum. The sulfonated mixture is drowned in ice water and the 2-methoxy-5-sulfobenzoylacetonitrile is salted out. 7.7 parts of the 2-methoxy-5-sulfobenzoylacetonitrile are dissolved in 20 parts of water with 20 parts of 10% soda ash. To this solution there is added a solution of 1.5 parts of diazotized 2-amino-4-nitrophenol. Additional soda ash is added during the coupling to maintain a pH positive to brilliant yellow. When the coupling is complete the reaction mixture is acidified, filtered, and the precipitated orange dyestuff recovered in good yield. It dyes wool an orange shade which is converted to a reddish-orange by after-chroming. The metachrome process gives a similar shade but with improved fastness. Cobalt and nickel salts in the dyebath give yellow and orange shades of improved fastness, while copper produces a yellow-brown shade of good fastness.

*Example No. 28*

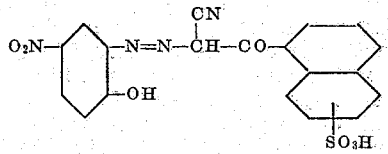

6 parts of alpha-naphthoylacetonitrile are gradually added to 24 parts of 20% oleum, temperature being kept below 10° C. Stirring is continued until sulfonation is complete. The reaction mixture is then drowned in ice water, filtered, and the sulfonated product precipitated by salting out.

A solution prepared in the usual manner by diazotizing 2.5 parts of 2-amino-4-nitrophenol is added slowly to a cool solution of 11.5 parts of sulfo-1-naphthoylacetonitrile dissolved in 50 parts of a 10% soda ash solution. When the coupling is complete the solution is treated with 20% of salt and acidified with a mineral acid. A

Example No. 29

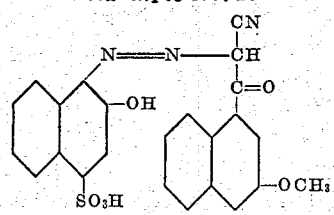

40.6 parts of methyl 2-methoxy-3-naphthoate is reacted with 9.7 parts of acetonitrile and 10.1 parts of sodium methylate, the acetonitrile being added at 80° C. and the reaction mixture then heated to 100° C. until completion. Thorough stirring should be employed and as the reaction mixture thickens 150 parts of dichlorobenzene may be added in portions in order to permit sufficient stirring. The product is isolated by dissolving in water and acidifying with a mineral acid. 4.5 parts of the product is dissolved in 30 parts of water and 5 parts of 20% sodium hydroxide and the solution cooled. To the cooled solution there is then added slowly a solution of 5 parts of diazotized 1-amino-2-hydroxy-4-naphthalenesulfonic acid in 20 parts of water and 5 parts of 20% sodium hydroxide. The reaction mixture is stirred at room temperature until the coupling is complete and the dyestuff is isolated as a bright red solid by filtering and washing with water. The product dyes wool a bright reddish-yellow shade which is converted to a Bordeaux shade by after-chroming. The metachrome method also gives a Bordeaux shade.

Example No. 30

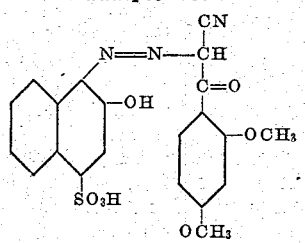

24.4 parts of methyl 2,4-dimethoxybenzoate is reacted at 80° C. with 6.8 parts of sodium methylate and 6.4 parts of acetonitrile, the latter being added slowly. After a short time the reaction mixture becomes very thick and 100 parts of dichlorobenzene is added to permit continued agitation. After the reaction is complete the 2,4-dimethoxybenzoylacetonitrile is recovered by cooling the reaction mixture, diluting with water and acidifying the aqueous layer with mineral acid. The resulting precipitate is removed by filtration, washed with sodium bicarbonate and dried, and has a melting point of 149–151° C.

1.9 parts of the product is dissolved in 20 parts of water and 3 parts of 20% sodium hydroxide. To this solution there is added slowly a solution of 2.5 parts of diazotized 1-amino-2-hydroxy-4-naphthalenesulfonic acid in 20 parts of water and 3 parts of 20% sodium hydroxide. Coupling takes place rapidly at room temperature and is brought to completion by gentle warming. The product is precipitated as a bright red solid by acidification of the reaction mixture. This product dyes wool a tan shade which is converted to a blue-red by after-chroming. A Bordeaux tint is obtained by the metachrome method. Red shades are obtained if salts of cobalt, nickel, and copper are used in the dyebath.

tan precipitate is removed by filtration and dried at 60° C.

I claim:

1. Azo dyestuffs having the following formula:

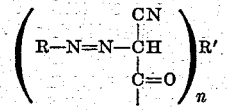

in which R is a radical of a diazotized amine included in the group consisting of amines of the benzene series and amines of the naphthalene series, having ortho to the azo group at least one metallizable group included in the group consisting of carboxyl and hydroxyl, R' is a member of the group consisting of aromatic, aralkyl and hydroaromatic radicals, and $n$ is an integer in the group consisting of 1 and 2.

2. Azo dyestuffs having the following formula:

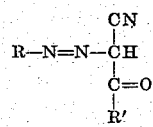

in which R is a radical of a diazotized amine included in the group consisting of amines of the benzene series and amines of the naphthalene series, having ortho to the azo group at least one metallizable group included in the group consisting of carboxyl and hydroxyl, and R' is a member of the group consisting of aromatic, aralkyl, and hydroaromatic radicals.

3. Azo dyestuffs having the following formula:

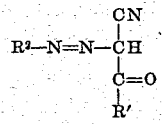

in which $R^2$ is a radical of the benzene series, having ortho to the azo group at least one metallizable group included in the group consisting of carboxyl and hydroxyl, and R' is a member of the group consisting of aromatic, aralkyl and hydroaromatic radicals.

4. Azo dyestuffs having the following formula:

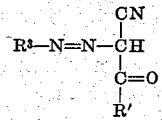

in which $R^3$ is an aryl radical of the naphthalene series, having ortho to the azo group at least one metallizable group included in the group consisting of carboxyl and hydroxyl, and R' is a member of the group consisting of aromatic, aralkyl and hydroaromatic radicals.

5. Azo dyestuffs having the following formula:

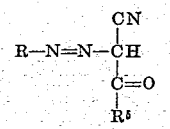

in which $R^5$ is an aryl radical and R is a radical of a diazotized amine included in the group consisting of amines of the benzene series and amines of the naphthalene series, having ortho to the azo group at least one metallizable group included in the group consisting of carboxyl and hydroxyl.

6. Azo dyestuffs having the following formula:

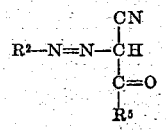

in which R⁵ is an aryl radical, and R² is a radical of the benzene series, having ortho to the azo group at least one metallizable group included in the group consisting of carboxyl and hydroxyl.

7. Azo dyestuffs having the following formula:

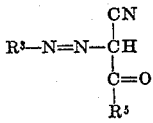

in which R⁵ is an aryl radical, and R³ is an aryl radical of the naphthalene series having ortho to the azo group at least one metallizable group included in the group consisting of carboxyl and hydroxyl.

8. As a new composition of matter the azo dyestuff obtainable from diazotized 1-amino-2-hydroxy-4-naphthalenesulfonic acid and benzoylacetonitrile and having the following formula:

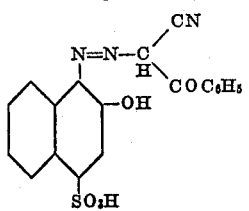

9. As a new composition of matter the azo dyestuff obtainable from diazotized 1-amino-2-hydroxy-4-naphthalenesulfonic acid and o-methoxybenzoylacetonitrile and having the following formula:

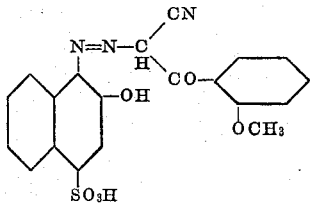

10. As a new composition of matter the azo dyestuff obtainable from diazotized 1-amino-2-hydroxy-4-naphthalenesulfonic acid and 3,4,5-trimethoxybenzoylacetonitrile and having the following formula:

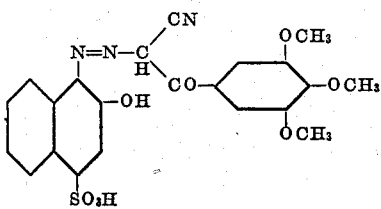

ROBERT SIDNEY LONG.